United States Patent [19] [11] 4,275,343
Fulton et al. [45] Jun. 23, 1981

[54] BACK EMF CONTROLLED PERMANENT MAGNET MOTOR

[75] Inventors: Donald E. Fulton, Stoneham; William P. Curtiss, Winthrop, both of Mass.

[73] Assignee: The Charles Stark Draper Laboratory, Inc., Cambridge, Mass.

[21] Appl. No.: 973,860

[22] Filed: Dec. 28, 1978

[51] Int. Cl.³ .......................... H02P 7/36; H02P 5/28
[52] U.S. Cl. ................................. 318/721; 318/724; 318/331
[58] Field of Search ............... 318/720, 721, 724, 805, 318/331, 696

[56] References Cited

U.S. PATENT DOCUMENTS

| 3,529,223 | 9/1970 | Vergez, Jr. | 318/331 |
| 3,663,878 | 5/1972 | Miyasaka | 318/331 |
| 3,965,405 | 6/1976 | Romano | 318/331 |
| 4,027,215 | 5/1977 | Knight et al. | 318/331 |
| 4,144,481 | 3/1979 | Clarke | 318/331 |
| 4,145,642 | 3/1979 | Kosaka et al. | 318/331 |

FOREIGN PATENT DOCUMENTS 2248914 4/1974 Fed. Rep. of Germany .
1300423 6/1962 France .

Primary Examiner—J. V. Truhe
Assistant Examiner—Richard M. Moose
Attorney, Agent, or Firm—Weingarten, Maxham & Schurgin

[57] ABSTRACT

A back EMF controlled, synchronous, permanent magnet motor capable of extremely high rotation speeds at high efficiency. The motor includes a permanent magnet flux source and excitation coils for producing a rotating magnetic field mounted on an iron free form to substantially eliminate core loss and resulting rotor drag. Back EMF is determined directly from the excitation and controls the excitation to produce a torque angle of substantially 90° between the magnet and coil fluxes. Coil excitation is used at maximum efficiency and hunting is avoided. The permanent magnet provides a high flux density that also allows a low current in the motor coils and thus reduces coil copper losses to further improve efficiency.

17 Claims, 12 Drawing Figures

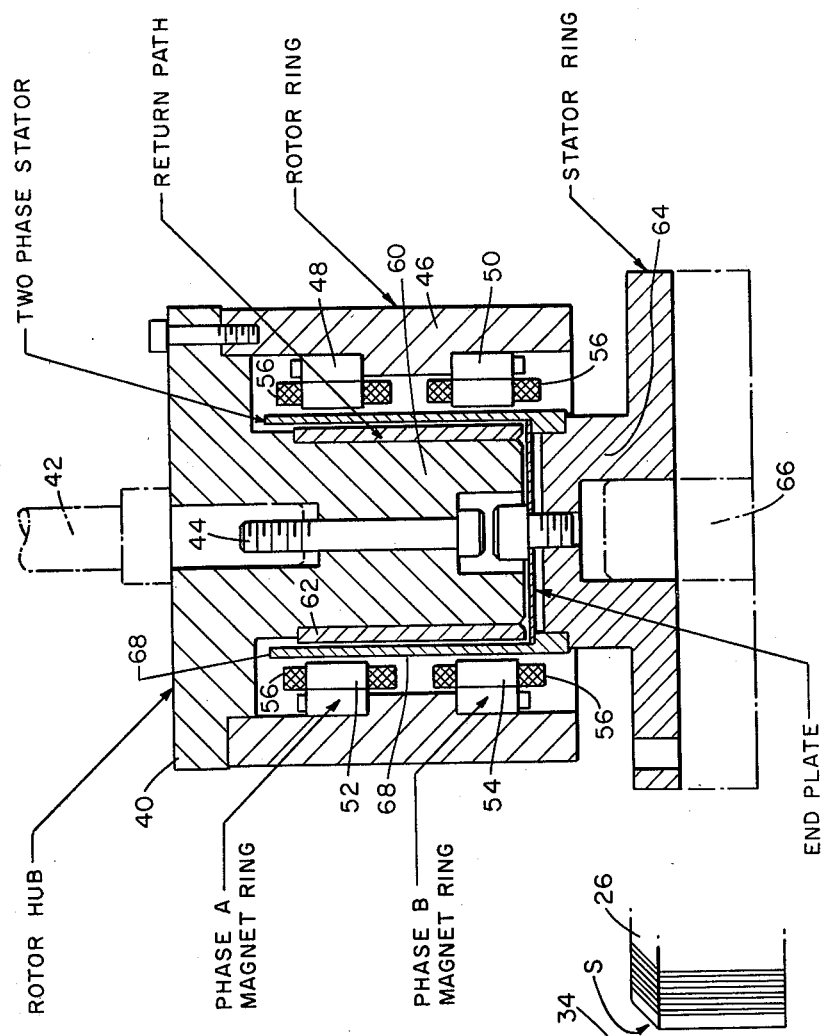
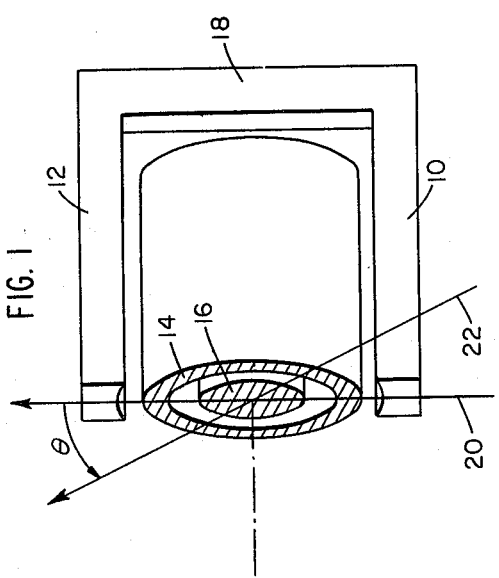
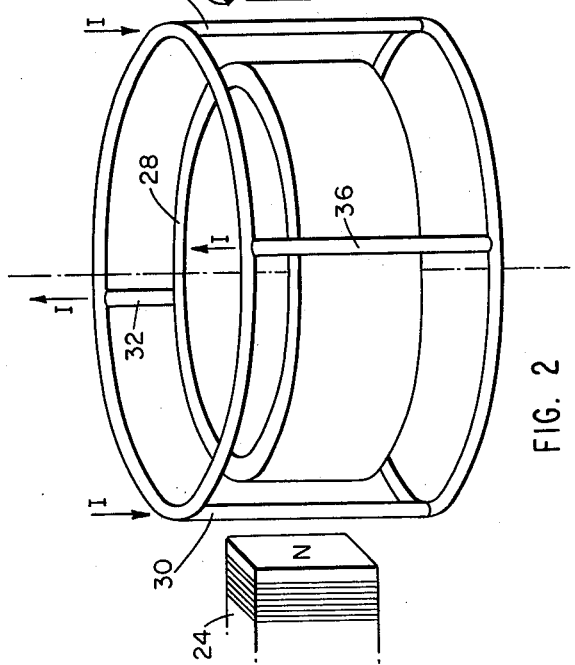

FIG. 5B
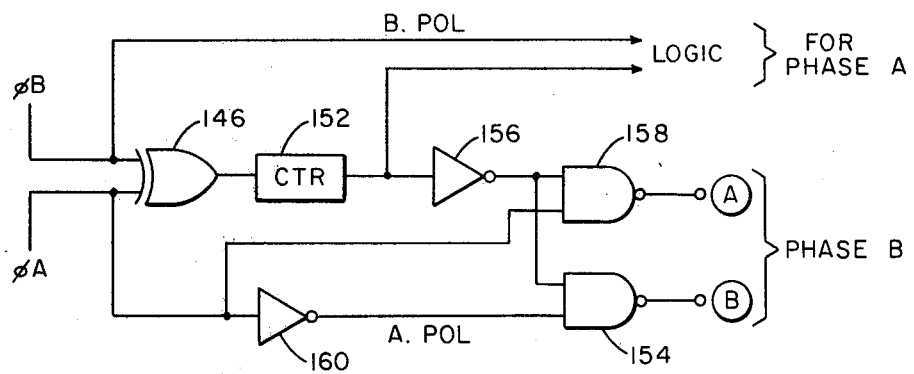
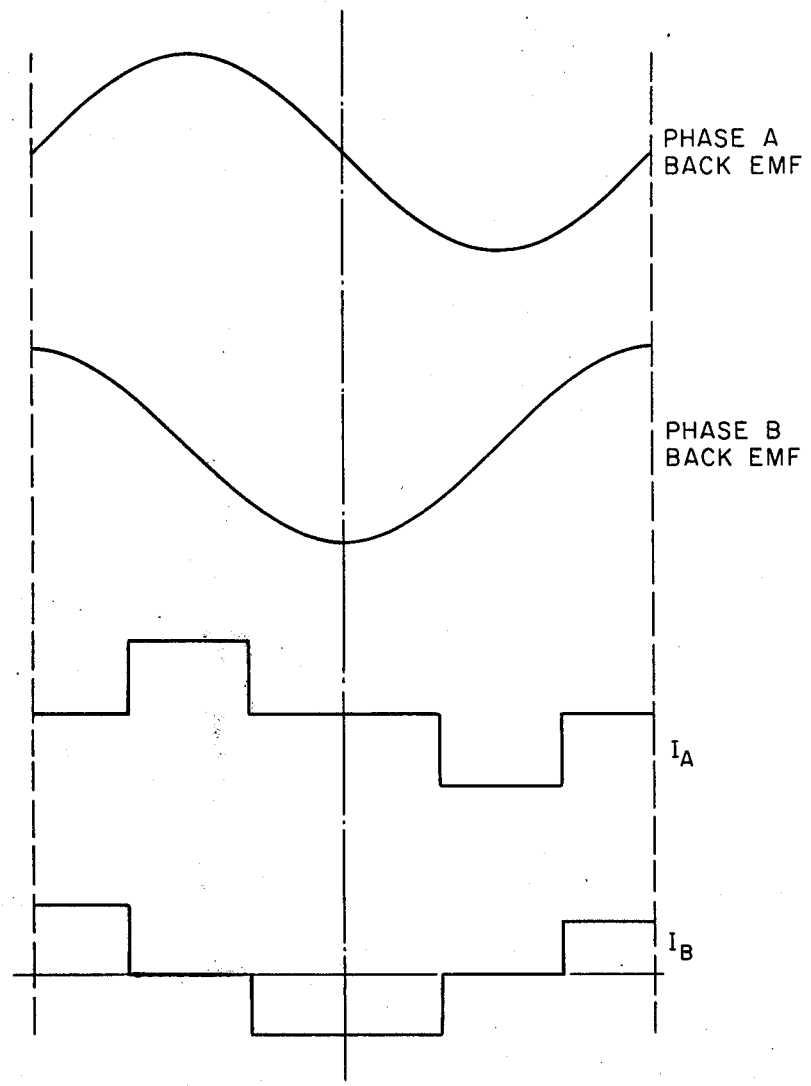
FIG. 6A

BACK EMF CONTROLLED PERMANENT MAGNET MOTOR

FIELD OF THE INVENTION

The present invention relates to permanent magnet motors.

BACKGROUND OF THE INVENTION

In certain applications for high speed, synchronous motors, such as in gyroscopes for precision inertial guidance instruments, motor efficiency is of great significance. An inefficient motor will absorb substantially more power than that required to spin the rotor, the excess going into heating of the motor structure. Aside from wasting often precious energy, the excess heating in a precision gyroscope can result in loss of operating accuracy through various factors understood in the art.

In a typical gyroscope, synchronous motor, stator coil excitation induces a magnetization of the rotor at an angle to the coil field, thus permitting a torque reaction between the rotor and stator. Several inefficiencies result from this arrangement. First, because the stator must incude iron, a high core loss results from the rotating field. A second inefficiency results from a less than 90° torque, or maximum angle requiring a magnetization flux from the windings beyond that necessary to produce the requisite rotational torque at a 90° angle. This also increases resistive losses in the coil windings due to the larger than necessary winding current.

In the typical gyroscope motor, a hysteresis motor, a set of stator windings, typically two- or three-phase, are excited to produce a magnetic field rotating at a predetermined rotational speed specified by the excitation frequency. The rotor is then magnetized by this flux creating a torque interaction between the magnetized flux of the rotor and the excitation flux of the stator. The rotor will be accelerated from rest until it reaches synchronous speed, at which point the magnetization direction of the rotor stays substantially constant. Such a motor operates with a very small angle between the flux induced by the stator windings and the magnetization flux of the rotor. This angle is typically a maximum of 38–42 degrees.

At synchronous speed, the hysteresis motor is dependent upon a small residual rotor magnetization to interact with the excitation flux to torque the rotor. This flux is normally weak and dependent upon the start-stop history of the motor thus adding to the required excitation in the stator windings to produce acceptable synchronous speed operation.

While permanent magnet motors, having a magnetically hard rotor, or stator, avoid some of these problems they contribute several problems of their own. Among these is no net torque on the rotor of a permanent magnet motor at other than synchronous speed. Such a condition makes starting difficult and produces an unacceptable risk of losing motor operation if the rotor even briefly drops out of sync. Moreover a permanent magnet motor must be operated at a substantially less than ideal torque angle to maintain synchronous operation with a torque reserve.

BRIEF SUMMARY OF THE INVENTION

In accordance with the teaching of the present invention, a high efficiency permanent magnet motor is provided in which there is no core loss and torque angle is controlled at an optimum torque angle. Motor winding back EMF is sensed directly from the applied excitation and is used to control the excitation to the permanent magnet motor at or near a torque angle of 90° over a wide range of speeds below and including synchronous operation. Additionally, the permanent manget motor is provided with an iron-free coil form through which the flux of the permanent magnet passes and which generates an interacting flux in response to applied excitation. The high flux from the permanent magnet decreases the necessary motor current to produce satisfactory motor operation thereby reducing the core and copper losses of the motor. The iron-free coil form eliminates losses. The motor can thus be operated at the peak efficiency point of a 90° torque angle so that the minimum of excitation is required and copper losses in the winding are kept to a minimum. At the same time active control in response to sensed back EMF prevents loss of synchronous operation or synchronous instability that would otherwise result from operating at the maximum torque point.

In order to commence motor rotation from rest up to a predetermined rotational velocity, typically a small fraction of synchronous speed, a starting circuit is provided that slowly increases the excitation frequency until a speed is reached at which back EMF control can effectively operate. From this point, the motor will continue to accelerate under the influence of a torque produced by feeding back the sensed back EMF of the motor to the excitation windings to produce a field leading the permanent magnet flux by 90°.

To insure synchronous operation at a desired speed a phase locked loop is employed. The excitation is modulated in response to the phase difference between a signal at the desired synchronous speed and the back EMF signal.

DESCRIPTION OF THE DRAWING

These and other features of the present invention are more fully set forth below in the solely exemplary detailed description and accompanying drawing of which:

FIG. 1 is a generalized view of a permanent magnet motor for use with the present invention;

FIG. 2 is a further conceptual view of a permanent magnet motor in accordance with the present invention;

FIG. 3 is a detailed sectional view of a permanent magnet motor embodying the present invention;

FIG. 6A is a waveform diagram useful in explaining the present invention;

DETAILED DESCRIPTION OF THE INVENTION

Figure 4:
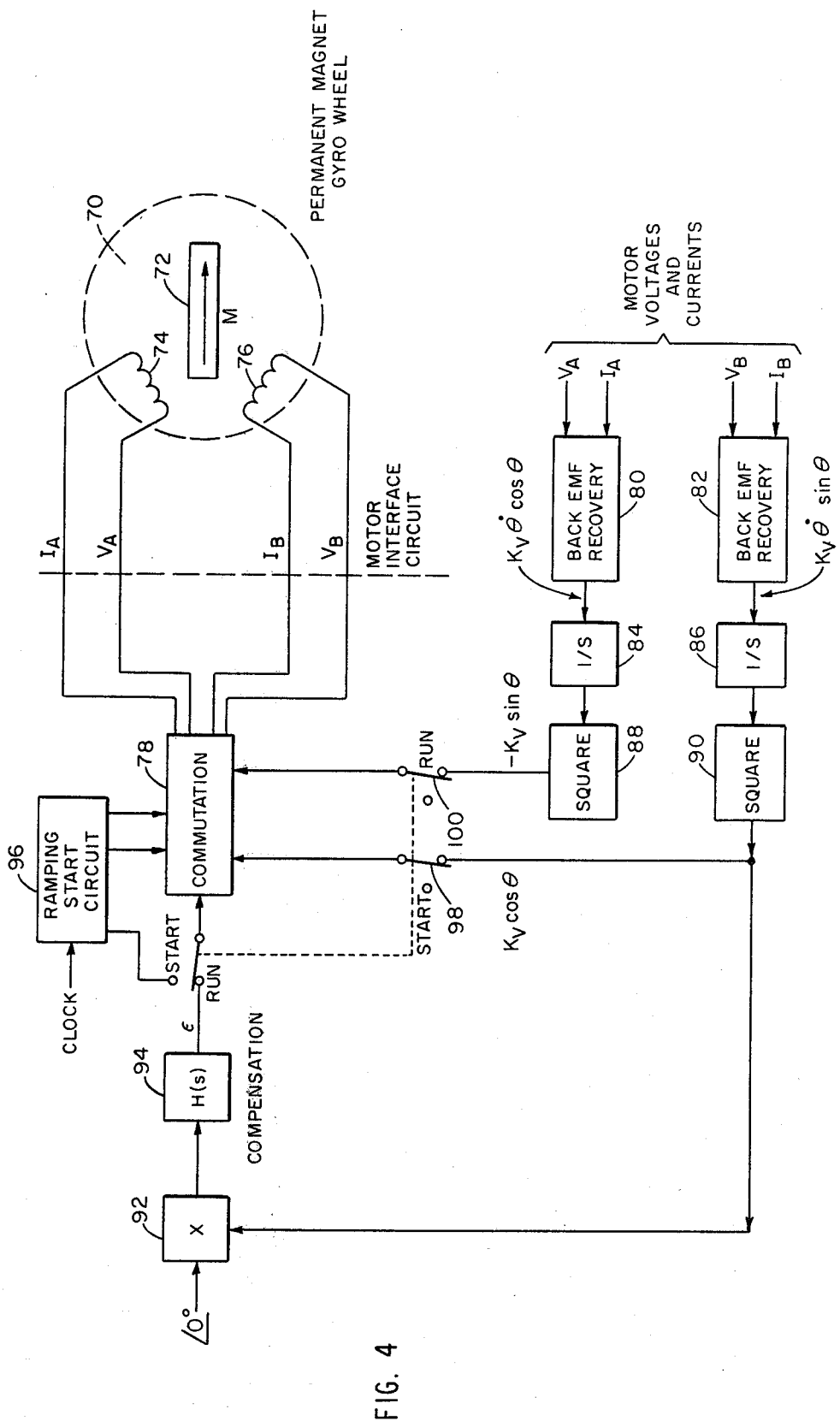
FIG. 4 is a block diagram of circuitry shown in greater detail in FIGS. 5–9 for operating a permanent magnet motor in accordance with the present invention.

The present invention contemplates a permanent magnet motor system operating at peak efficiency by eliminating core losses, reducing excitation current and optimizing the torque angle between the permanent magnet flux direction and excitation flux. Maximum torque at a torque angle of 90° is achieved by an active back EMF detection and power commutation system. The permanent magnet flux sees a nonmagnetic coil core that does not damp rotation at high motor speeds. The optimal operating conditions permit a lower excitation current that further reduces copper losses in the excitation windings. The invention is particularly applicable to gyroscope motors where high efficiency, and resulting limited heat generation, are important.

With reference now to FIG. 1, a conceptualized motor in accordance with the present invention is illustrated.

Permanent magnet pole faces 10 and 12 are placed to direct a magnetic flux through windings on an element 14 excited by external power. An internal element 16 of high magnetic permeability lies within the winding element 14. The pole faces 10 and 12 are typically joined by an external flux return 18 to complete the flux path. The drawing of FIG. 1 is intended to be solely conceptual and the placement of components and parts is not intended to be limiting.

The permanent magnet, consisting of the pole faces 10 and 12 and the return path 18, along with the internal return path 16, may be either the stator or rotor in the actual motor design; the winding element 14 being the opposite element. In typical gyroscope fabrication, as illustrated in FIG. 3, the rotor will be the permanent magnet element and the stator will contain the externally excited windings.

Flux from the permanent magnet pole faces 10 and 12 passes through the winding element 14 and inner return path 16 as a vectored flux represented by the vector 20 in FIG. 1. Similarly, the winding element 14 will be excited by electrical current to produce a rotating magnetic field represented by the vector 22. Typically this is achieved by quadrature excitation of orthogonally disposed two-phase windings on the element 14. When the motor is operating at synchronous speed, the vector 22 and the vector 20 will rotate together separated by an angle theta, which results in a torque interaction between the structures creating the two magnetic fields. According to known magnetic theory, the torque is maximum when the angle is a perfect right angle of 90°. The torque varies in accordance with the sine law function of the angle between the flux vetors. In typical synchronous operation of a permanent magnet motor, or a hysteresis motor in which the flux vector 20 is produced not by a permanent magnet flux but by induced magnetization from the rotating field of the coil element 14, the angle will typically be a small angle such as 30°. This small angle is unavoidable, but contributes the benefit of a torque reserve to maintain stable synchronous operation of the motor. If the excitation for the winding element 14 were reduced to the point where the angle were 90°, the least perturbation would increase the angle beyond 90° to the negative slope region at which point torque falls off and the rotor would slip out of synchronization. In the case of a hysteresis motor, it might be possible to regain synchronization, but in the case of a permanent magnet motor once synchronization is lost substantially no net torque is produced upon the rotor.

This low torque angle of operation results in substantial inefficiencies in prior art motor designs. In particular with a low torque angle between the flux vectors, the majority of the excitation current applied to the winding element 14 goes into useless magnetization in a hysteresis motor or in the case of a permanent magnet motor simply generates a large magnitude flux vector 22 in order to provide a sufficient flux in the orthogonal direction to overcome rotor friction and windage, etc. This excess flux and excitation current produces core losses in iron cores and copper losses, both generating heat and inaccuracies.

In conventional motors, the flux path is normally of low reluctance high permeability material like iron except for clearances for element rotations. In conventional hysteresis motor designs, large magnetization currents are necessitated in order to induce a rotor magnetization with flux of sufficient strength for proper motor operation. The resulting iron core mgnetization produces high core losses and prevents high speed operation. In the permanent magnet motor of the present invention the core structure that is exposed to a varying flux, and core losses, is eliminated. Also because the permanent magnet is relied upon to establish the magnetic flux, only a small current is necessary in the winding elements to produce a torque of sufficient magnitidue to interact with the permanent magnet flux for rotor torquing. The resulting lower winding current saves a significant resistive power loss in the winding coils resulting from resistive heating. This concept produces an efficient permanent magnet motor, except that it is incapable of start up and acceleration to synchronous speed by itself.

The present invention also contemplates the use of back EMF control of the torque angle and excitation magnitude for optimum rotor torquing. The vector 20 position is detected in a back EMF sensing circuit, and the currents to the windings of the element 14 are then adjusted to produce the flux vector 22 at substantially 90° to the flux vector 20 over a large range of motor speeds. This insures maximum torque on the motor for the excitation current applied and additionally insures synchronous stability, otherwise impossible in a permanent magnet, synchronous motor. The closed loop formed by control of the winding excitation by the back EMF insures that even though the rotor is perturbed, thereby perturbing the angle between the flux vectors, the excitation will follow it in phase. Additional circuitry is provided to vary the excitation magnitude with torque angle, thus insuring stable sychronous operation of the motor.

The resulting advantages of a permanent magnet, actively controlled synchronous motor may then be briefly stated as follows: (1) reduced losses from the elimination of a high permeability core for the excitation windings permitted by the effective use of a high flux density provided by a powerful permanent magnet; (2) maximum efficiency in the utilization of the excitation energy by maintaining an optimal angle between the excitation flux and permanent magnet flux; (3) reduction in excitation and resulting losses due to the high permanent magnet flux achieved and the optimization of the torque angles; (4) an assured synchronization stability resulting from the closed loop, phase and magnitude modulation of winding excitation developed from back EMF sensing.

With reference now to FIG. 2, there is illustrated a single phase of a two-phase permanent magnet synchronous motor of the type more fully illustrated in FIG. 3. As shown in FIG. 2, each of two phases, typically one above the other, contain opposing magnetic poles 24 and 26. The permanent magnet and its poles 24 and 26 are typically the rotor along with an internal return path 28, typically of soft iron. The stator consists of a set of windings, only the vertical portions of which are illustrated in FIG. 2. As such, the stator will include a plurality of vertically disposed conductors 30, 32, 34, and 36 positioned between the pole faces 24 and 26 and the flux return internal member 28. These conductors represent the edge conductors of the stator coils. The number of actual conductors 30–36 and coils is dependent upon the number of winding poles. Typically there will be 12 winding coils on the stator element in combination with 3 pairs of permanent magnet pole faces 24 and 26. In the present illustration of FIG. 2 only a single pair of magnetic pole faces is shown and correspondingly only four coils are represented on the stator with the vertical portions of the coils represented by the conductors 30, 32, 34, and 36. As illustrated, each adjacent conductor of the four conductors 30, 32, 34 and 36 will conduct current in an opposite vertical direction resulting in a predetermined flux vector horizonally directed through the stator element. In the two-phase motor more fully illustrated in FIG. 3, two systems of the type shown in FIG. 2 are provided, one directly above the other, as will be clear from FIG. 3. With each phase excited in quadrature, the effect of a rotating magnetic field is achieved.

With reference now to FIG. 3, there is illustrated in sectional view a permanent magnet, iron-free core, motor for use in the back EMF controlled motor system of the present invention. In the embodiment illustrated in FIG. 3 the permanent magnet is a part of the rotor comprising an inner rotor hub 40 which is centrally fixtured onto a shaft 42 through a bolt 44 for rotation about bearings not shown. The rotor hub 40 has attached to it a rotor band 46 forming the outer cylindrical portion of the rotor. On inner facing surfaces of band 46 are placed first and second magnet rings 48 and 50 for respective first and second phases of the two-phase motor system. The magnet rings 48 and 50 include 6 pole faces 52 and 54 for each of the rings 48 and 50 respectively. In this case with 6 pole faces, the motor is a 6 pole motor. Initial magnetization of the rings 48 and 50 may be achieved through coils 56 would about the pole faces and which may be energized to permanently magnetize the magnet rings 48 and 50 and their corresponding pole faces 52 and 54 with opposite, adjacent magnet poles. Typically the pole faces are of aluminum nickel cobalt alloy or similar material.

The rotor hub 40 includes an inner spindle 60 which has sleeved thereon a return path cylinder 62 of magnetic material like a nickel iron alloy to receive the flux from the pole faces 52 and 54 of one polarity, and transmit it to the pole faces of the opposite polarity.

The stator includes a stator hub 64 which may be rigidly attached to a platform 66. Stator hub 64 supports an upwardly extending stator 68 in the form of a cylindrical tube of non magnetic material which fits in the air gap between the pole faces 52 and 54 and the return path 62. Where the upper and lower halves of the stator cylinder 68 are adjacent to the stator rings 48 and 50, they are provided with generally pancaked-shaped windings corresponding to each of the pole faces 52 and 54. In the case of a 6 pole motor there will be 6 windings on each of the upper and lower portions of the stator cylinder 68.

The stator cylinder may typically be formed of ceramic material, providing a very low loss flux path between the pole faces 52 and 54 and the return path cylinder 62, the avoidance of a magnetic material here reduces core losses resulting from currents induced by the oscillating magnetic flux penetrating the coil form.

With respect now to FIG. 4, there is illustrated a block diagram of circuitry for exciting a permanent magnet motor with back EMF control in accordance with the present invention. A conceptualized motor 70 is shown having a permanent magnet rotor 72 and phase A and B excitation windings 74 and 76 respectively. These windings are excited through a motor interface circuit from a commutation circuit 78 in quadrature phase with a phase angle and magnitude determined by the remaining control electronics of the block diagram.

In particular, the phase angle relative to the rotor flux angle is controlled by first and second back EMF recovery circuits 80 and 82. These circuits respond to the voltage and current applied to the windings 74 and 76 to develop an output signal representative of the phase angle of the magnetic field from the rotor 72. The voltage across each of the coils 74 and 76 is proportional to a quantity representative of and in phase with the back EMF in that coil, generated by the magnetic field of the rotor 72, and a value representing the voltage drop across the resistive and inductive load of each coil. The recovery circuits 80 and 82 operate differentially to compensate the voltage appearing across the input to the motor coils for the current dependent factors. The resulting output of the circuits 80 and 82 is then directly proportional to the back EMF in the respective coils. It is significant that this sytem provides a back EMF signal directly from the applied excitation using only normal motor excitation cables.

It is useful to understand several properties of back EMF in appreciating the invention. First, the back EMF voltage amplitude is a function of the angular velocity of the rotor, increasing as the rotor velocity increases. The output of the recovery circuits 80 and 82 will then be a sine or cosine function of the angle of the rotor multiplied by the rate of change of the angle as indicated in the figure. The back EMF in each coil leads the flux angle of the flux in the permanent magnet by 90°. Thus, in order to insure a 90° separation between the winding flux vector and the magnetic flux vector of the permanent magnet, the recovered back EMF phase can be used directly to control the current to that winding, being precisely in phase with it. This permits a 90° relationship between the excitation field and the permanent magnet field to be maintained.

Additional signal processing on the recovered back EMF signal, however, is preferable to avoid a variation in magnitude with speed. This is particularly desirable where, as here, further circuitry is provided to run the motor up to synchronous speed from some lower speed. Also it is desirable to filter noise from the recovered signal and to provide these operations without introducing a speed dependent phase shift in the signals. To accomplish this function, integrators 84 and 86 are provided responsive to the outputs of the recovery circuits 80 and 82. The characteristics of the integrators removes the speed dependency of the output signal magnitude corresponding to back EMF and provides an inherent filtering. The integrator also generates a precise 90° phase shift at all rotational speeds so that the phase changes a known quantity. In the case of the two-phase motor with quadrature drive, the precise 90° phase change is of no great consequence since it merely means that the recovered and integrated signal corresponding to back EMF from one winding is used to define the in-phase drive to the other of the two-phase windings.

The outputs of the integrators 84 and 86 can, for this purpose, be applied directly through variable gain power amplifiers to the respective windings 74 and 76 of the permanent magnet motor, achieving the desired 90° drive. For circuit simplicity, and as shown in FIG. 4, the outputs of the integrators 84 and 86 are first converted to squarewaves by corresponding square-up circuits 88 and 90. These signals are then used to selectively switch a variable voltage magnitude for application to the coils 74 and 76 in alternating polarities, phased 90° from each other.

The purpose of the variable magnitude input to the motor 70 is to permit phase locking of the drive signal to a clock frequency representing the desired synchronous speed for the permanent magnet motor. If a constant magnitude signal were merely switched through the coils 74 and 76, assuming the motor had been run up to a sufficiently high point to develop a usable back EMF, the circuitry described above would generate a constant torque to the permanent magnet rotor that would result in unlimited acceleration until frictional losses balanced the applied torque.

To establish synchronization, a further control loop is employed. The output of one of the square-up circuits, such as square-up circuit 90, is applied to a phase/frequency detection circuit 92 in combination with a clock input frequency corresponding to the desired synchronous motor speed. The detection circuit 92 provides an output signal representative of the phase between the recovered and squared-up back EMF signal and the clock input. This output is in turn filtered by a compensation circuit 94 to enhance stability. At synchronous speed, the phase difference between the two inputs to the phase detector 92 will vary the magnitude of the compensation circuit output by a value representative of the phase error. This signal is amplified as necessary and switched to the coils 74 and 76 by a commutation circuit 78 in accordance with the phase information from the back EMF signals. This loop therefore insures that as the permanent magnet rotor accelerates ahead of synchronous phase, the magnitude of the torque signal is dropped to restore its rotational angle with respect to the rotating field from the excitation windings. The opposite effect occurs when the rotor begins to lag more than 90 behind the phase angle of the excitation field from the windings 74 and 76. At speeds significantly below synchronous speed, the logic of detector 92 generates an error signal of sufficient magnitude to insure continuous acceleration of the rotor until synchronous speed and lock-in is achieved.

In order to start the motor from zero speed, a ramping start circuit 96 is provided which, during start-up, typically up to approximately 20% of synchronous speed, replaces the error signal magnitude as applied to the input to the commutation stage 78 with a signal of fixed amplitude and slowly increasing frequency. Start circuit 96 also disconnects the commutation phase control signals from the back EMF recovery loop and applies instead the slowly increasing commutation rate to the commutation and power amplifier stage 78.

The rate of increase of the commutation frequency is selected to be sufficiently slow to insure that the permanent magnet rotor will follow it synchronously. At a predetermined rate of rotation, the ramping circuit 96 is switched out of the drive control loop and the phase error and back EMF switching control signals applied in their place. For this purpose, commonly controlled switches 98 and 100 are provided for selection between the phase error amplitude modulated signal and the constant amplitude signal and selection of the back EMF commutation signals.

Figure 5A:
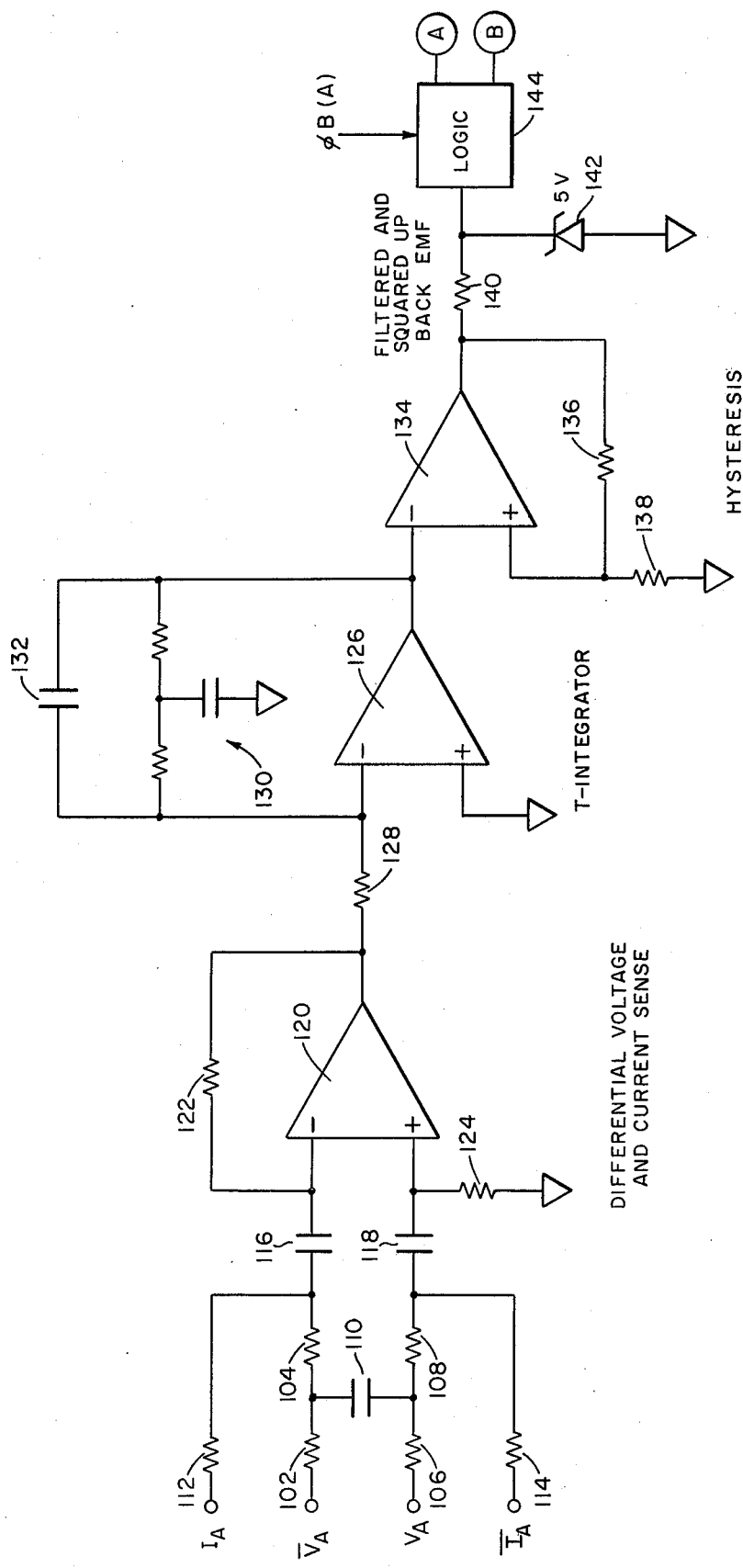
FIGS. 5A & B show a circuit diagram of a back EMF sensing system for use in the present invention.

The details of the circuitry illustrated with respect to FIG. 4 are presented below in conjunction with the circuit diagrams of FIGS. 5-10. With reference now to FIGS. 5A and B, there is illustrated circuitry used for recovering back EMF directly from the motor terminal voltages and currents. While only one circuit is illustrated in FIGS. 5A and B for back EMF recovery, and it is indeed possible to derive the commutation control from a single winding in a two phase system, it is preferable that circuitry according to FIGS. 5A and B be provided for recovering the back EMF from each winding. As shown in FIG. 5, the phase A voltage across the phase A windings is applied through a filter consisting of series resistors 102 and 104 and series resistors 106 and 108 for respective winding terminals. A capacitor 110 is provided to join the nodes between the resistors 102 and 104, and 106 and 108. A current signal, developed across a small current sensing resistor in the ground lead for each of the coils in the motor is applied, in a polarity opposite to that for the voltage signal, to input resistors 112 and 114 and through coupling capacitors 116 and 118 respectively to differential inputs of an operational amplifier 120. The voltage signals through the resistors 104 and 108 are also applied through the coupling capacitors 116 and 118. The operational amplifier 120 has a negative feedback, gain determining resistance 122, connected between its output and inverting and a balancing resistor 124 is provided from a noninverting input to ground.

The resistors 112 and 114 are selected to scale the magnitude of the current input, in combination with the resistors 102, 104, 106, 108 and capacitor 110, to effectively subtract from the magnitude of the voltage signal a voltage corresponding to the resistive and inductive voltage drop generated in the windings in response to the applied current. For this purpose, the s-plane pole on the voltage input filter is selected to correspond to the R/L pole of the motor windings. The coupling capacitors 116 and 118 are preferably selected to have a cross-over frequency at some low rotational rate for the motor and beyond which back EMF control is effective to run the motor up to synchronous speed. A typical figure for such a rate is 20% of synchronous speed although a back EMF control is possible at a substantially lower speed. The output of the operational amplifier 120 is applied to an integrating operational amplifier 126 through an input resistor 128. A "T" filter 130, parallel to an integrating capacitor 132 is provided in a negative feedback path from the output of the operational amplifier 126 to the inverting input. The integrator provides the conversion of a speed dependent back EMF signal to a substantially speed independent signal and filters out phase jitters that could result in synchronous instabilities in the back EMF control loop. The T filter may, optionally, be terminated at the same R/L pole as the filter in the input to the operational amplifier 120 to compensate for its phase shift.

The output of the operational amplifier 126 is applied to the inverting input of a further operational amplifier 134 having a positive feedback resistor 136 to the noninverting input, also applied to ground through a resistor 138. The positive feedback generates a latching function converting the integrated sinewave output of the amplifier 126 to a squarewave. The output of the operational amplifier 134 is applied through a resistor 140 to a diode 142 for logic compatibility and then into a logic circuit 144.

Figure 6:
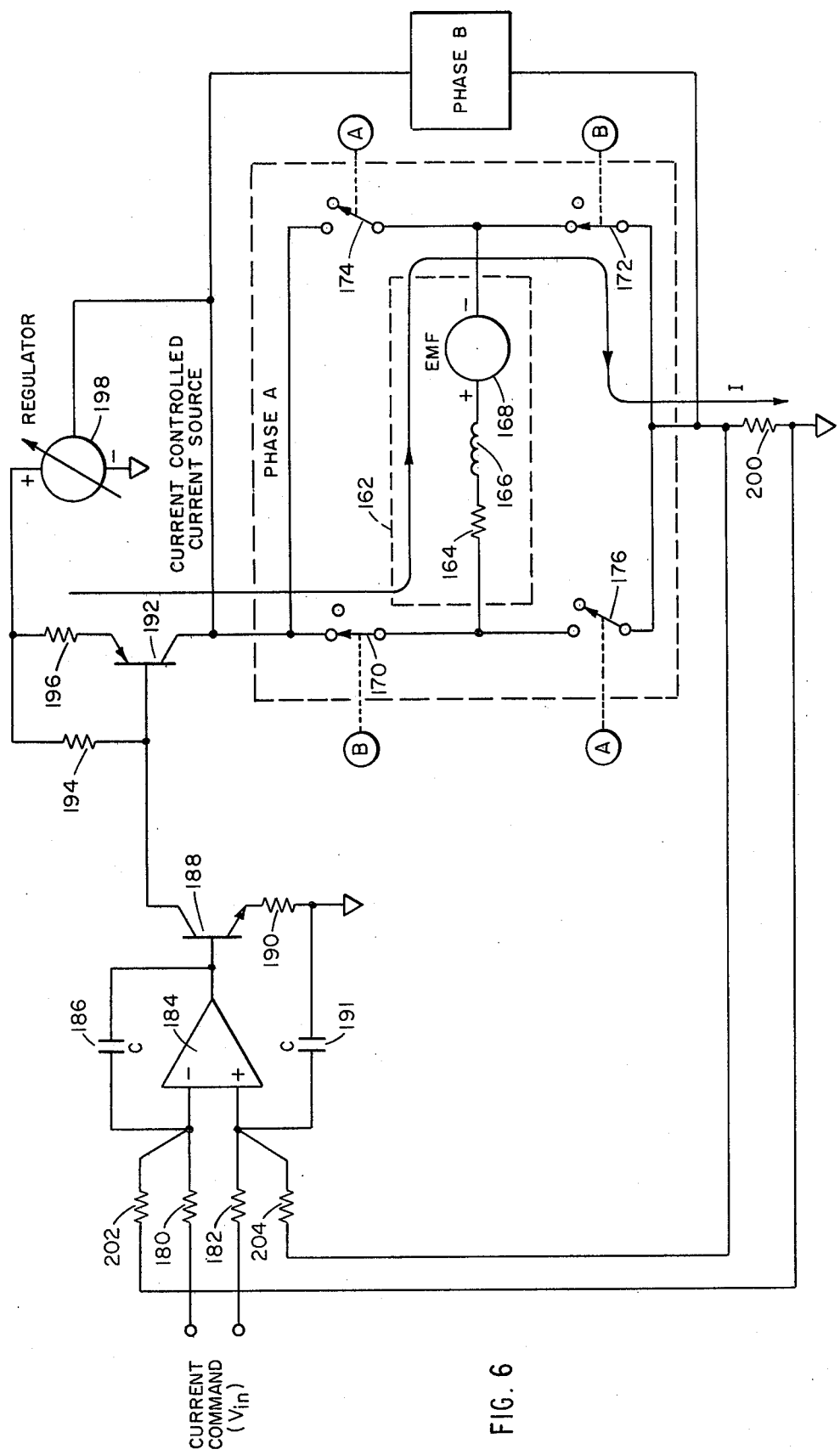
FIG. 6 is a circuit diagram of a permanent magnet motor driver for use in the present invention.

The logic circuit 144 also receives the output from the back EMF sensing circuit for the phase B circuitry. As shown in FIG. 5B the two back EMF sensed signals as squared up are applied within the logic circuit 144 to an exclusive OR gate 146 which generates a square waveform. This signal is inappropriate in a two-phase circuit for switching current through the coils at 90° lead angles and is therefore shifted in phase by 90°. This shifting may be done in several ways but is conveniently done by a constant delay provided by a counter 152 in the logic circuit 144. By using a fixed delay, where the duty cycle is only 50% of the total rotation cycle for the motor, no loss in efficiency is experienced at synchronous speeds while only a small loss in efficiency is achieved during run-up. Since the need for efficiency is at synchronous operation, the fixed delay provides a useful and simple manner for achieving the switching controls for the commutation circuit. The output of the counter 152 is applied to one input of a NAND gate 154 and through an inverter 156 to one input of a NAND gate 158. The squared and filtered phase A output is applied through an inverter 160 to the opposite inputs of the NAND gates 154 and 158. The outputs of the NAND gates 158 and 154 provide the phase B, A and B switch controls of the commutation system as illustrated in FIG. 6 to follow. Phase A controls are generated in a similar manner from the output of the counter 152 and the squared-up back EMF signals from the phase B sensing circuit.

With respect now to FIG. 6, there is illustrated the commutation and power amplifier circuitry for driving one of the two phases of the two-phase motor illustrated above. In particular, the windings for phase A are illustrated as a funtional element 62 which includes the winding series resistance 164, series inductance 166 and series EMF generator 168. A set of four switches 170, 172, 174, and 176 are provided to apply current through the winding element 162 in a selected polarity or not to apply it in accordance with the switching signals developed from the gates 158 and 154 in FIG. 5B. The switches 170-176 are typically solid state devices but are conceptually represented as mechanical switches in the drawing of FIG. 6.

The magnitude of the current switched by the switches 170-172 is controlled by a current command input from the compensation circuit 94 through input resistors 180 and 182 to differential inputs of an operational amplifier 184. The output of the amplifier 184 is returned through a capacitor 186 to the inverting input and it is additionally applied to an amplifier stage 188. A stabilizing capacitor 191 is connected between the noninverting input of the amplifier 184 and circuit common. Transistor amplifier 188 has its emitter grounded through a resistor 190 and its collector applied to the base of a further transistor amplifier 192 acting as a current driver for the two phases of the motor windings. The transistor 192 is energized with voltage applied to its base and emitter through respective resistors 194 and 196 from a voltage regulator 198 which responds to the collector voltage to maintain a predetermined voltage between the collector and the common side of resistors 194 and 196. This voltage regulation feature permits more accurate control of the winding current. Current regulation is provided by sensing the voltage across a small value resistance 200 between the motor windings and ground. The voltage across the resistance 200 is applied differentially to the amplifier 184 through resistors 202 and 204. This current feedback controls the current excitation to the motor windings at a magnitude proportional to the input current command signal applied through the resistors 180 and 182. In this manner, the current command is effective to establish a predetermined current through the motor windings. Actual current sensing is preferred in the case of a high reluctance permanent magnet motor since the overwhelming contribution to motor winding voltage is back EMF as opposed to the voltage drop generated by the motor impedances.

The net effect of the current applied to and back EMF recovered from the phase A and B windings is illustrated in FIG. 6A. The logic circuitry 144 of FIG. 5 provides 50% duty cycle current to each winding resulting in an efficient 100% overall duty cycle.

Figure 7:
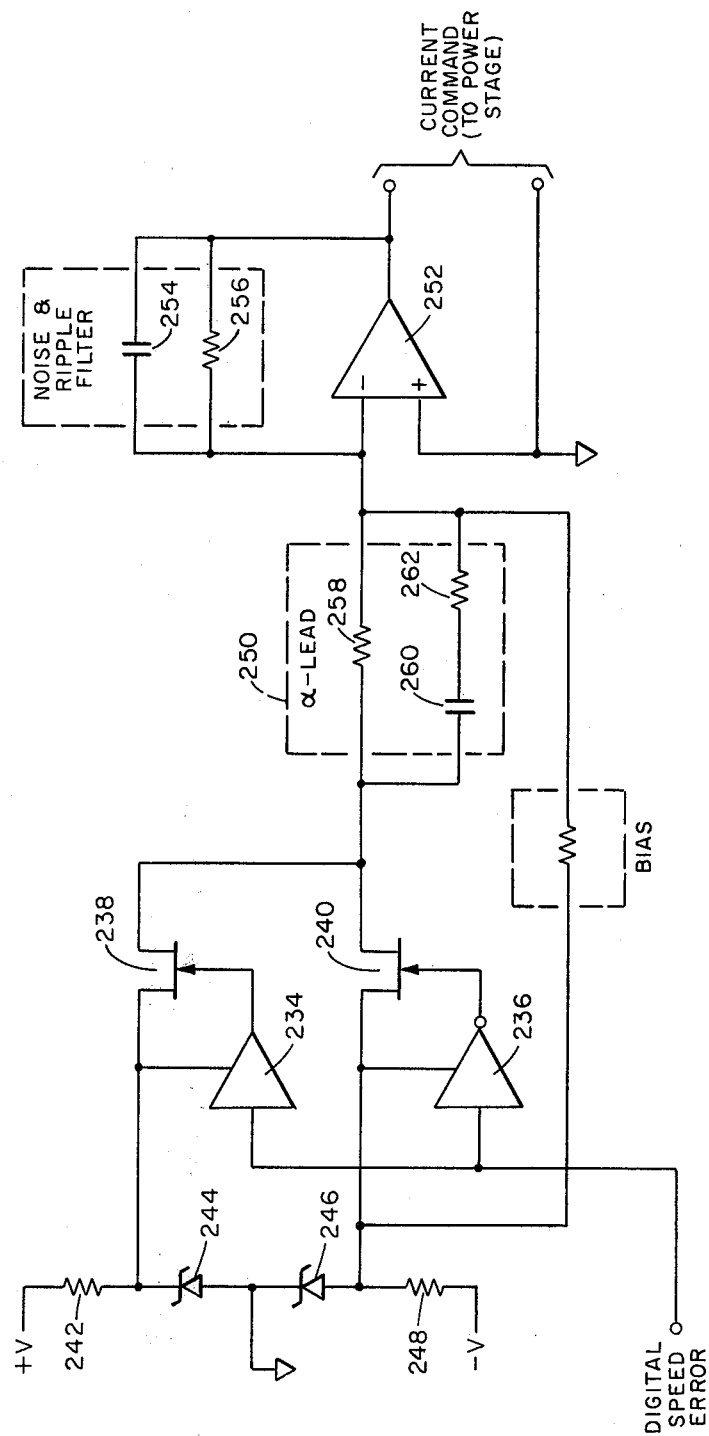
FIG. 7 is a circuit diagram of circuitry for use in synchronizing rotational speed to a predetermined oscillator frequency.
Figure 8:
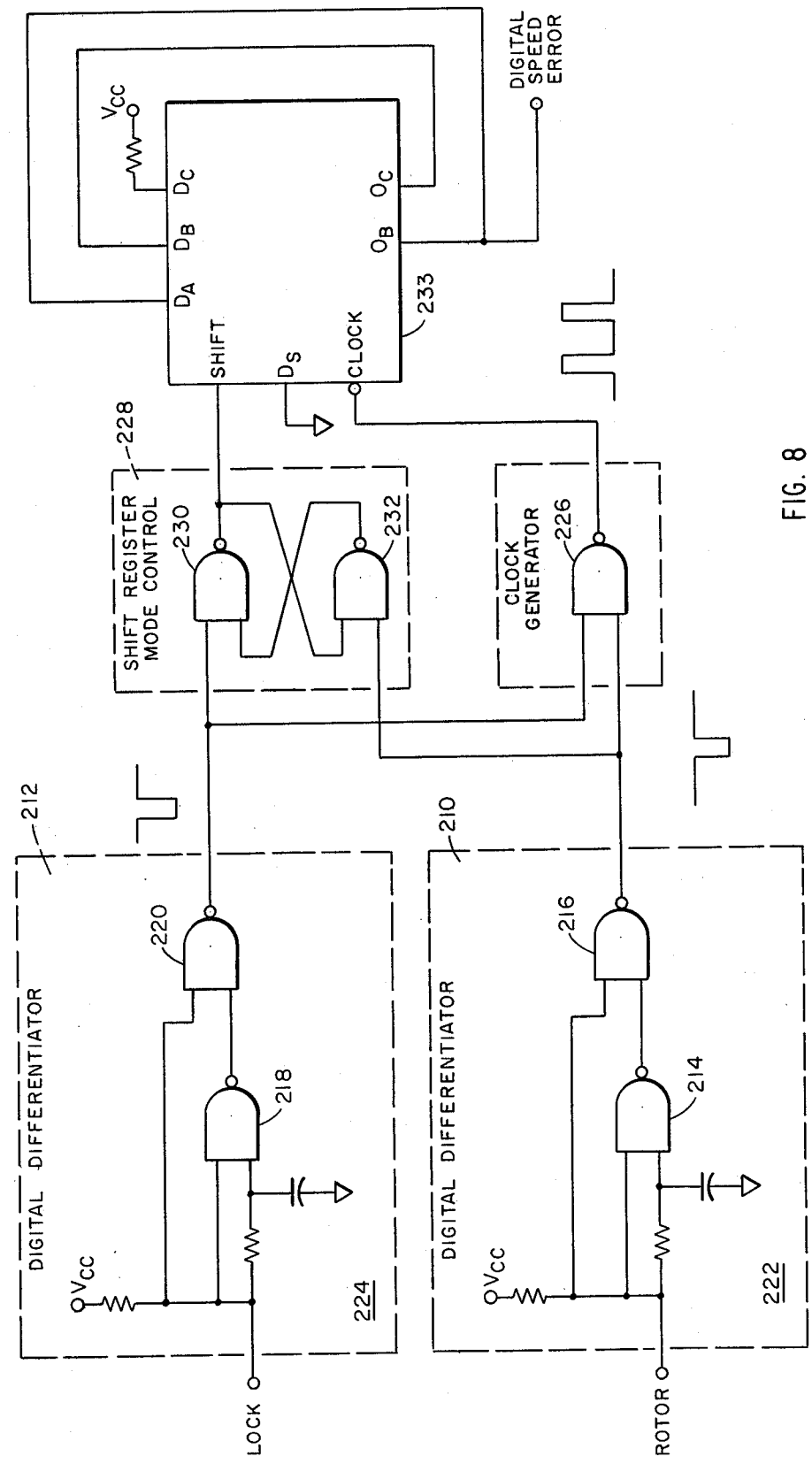
FIG. 8 is a circuit diagram of further circuitry for use in synchronizing permanent magnet rotor rotation rate to a clock frequency.

The current command input to the commutation and power amplifier stage of FIG. 5, in effect an error signal representing phase error between the clock definition of synchronous speed and the detected back EMF phase, is provided by circuitry illustrated in detail in FIGS. 7 and 8.

The actual current command is provided by the output of compensation circuitry illustrated in FIG. 7. This in turn responds to the output of a phase and frequency detector circuit illustrated in FIG. 8. This detector circuit receives as inputs a clock signal representative of desired synchronous speed and the output of one of the back EMF sensing circuits in squared-up form. The specific circuitry of FIG. 8 combines both phase and frequency detection to prevent phase locking at simple fractions of the desired rotational speed. In the phase and frequency detector circuit of FIG. 8, both the squared-up back EMF representing signal and clock signals are applied through respective digital differentiators 210 and 212 which consist of a pair of series-parallel connected NAND gates 214, 216 and 218, 220 respectively. One input of each of the first NAND gates 214 and 218 is provided through simple low-pass filters 222 and 224 respectively. While the clock and back EMF signals are applied directly to the other input of NAND gates 214 and 218 and in combination with the output of those gates to the further NAND gates 218 and 220 respectively. There results a negative going pulse corresponding to the existence of each respective clock or back EMF input squarewave segment. The outputs of the two differentiators 210 and 212 are nanded by a NAND gate 226 and applied as the clock input of a shift right shift register 233. The outputs of the differentiators 212 and 210 are applied to respective set and reset inputs of a bistable multivibrator 228 consising of cross-coupled NAND gates 230 and 232. The output of the NAND gate 230 is applied as the shift control input to the shift register 233. The shift register 233 is a three-bit shift register in which the second and third stage outputs are applied back to the first and second stage inputs respectively. The resulting shift register function is to provide a shift right of a binary zero for each clock pulse and a shift left of a binary one in response to each back EMF generated pulse. A continuous succession of binary zeros appears in the center stage output, forming the speed error signal during run-up. During synchronous speed operation binary ones and zeros will alternate in the center stage with duty cycles representative of the phase error.

The error signal at the middle bit of the shift register 233 is applied to the filter compensation circuit of FIG. 7. In the compensation circuit, the error signal is applied through inverting and noninverting buffers 234 and 236 respectively to gates of corresponding FET transistors 238 and 240. The respective source inputs of the FETS 238 and 240 are at voltages balanced about ground through a supply regulator consisting of series connected resistor 242, zener diodes 244 and 246, centrally grounded, and resistor 248; all connected between equal positive and negative voltage levels. The drain outputs of the FET transistors 238 and 240 are connected in common and applied through an alpha-lead filter 250 to the inverting input of an operational amplifier 252. The inverting amplifier 252 has a filter capacitor 254 connected in a negative feedback loop from its output to its inverting input, with the capacitor shunted by a resistor 256 to inhibit the integration function while providing a similar filtering function.

In operation, the digital speed error signal consisting of binary ones and zeros is converted to respective positive and negative dc levels, by the action of the buffers 234 and 236 and FET's 238 and 240. The filter 250 which consists of a parallel grouping of resistor 258 in parallel with a series combination of a capacitor 260 and resistor 262 provides an alpha-lead of approximately 10° to the inverting input of the operational amplifier 252 for small signal compensation. The output of the operational amplifier 252, a dc level representing phase error, is supplied as the current command to the commutation circuitry of FIG. 6.

Figure 9:
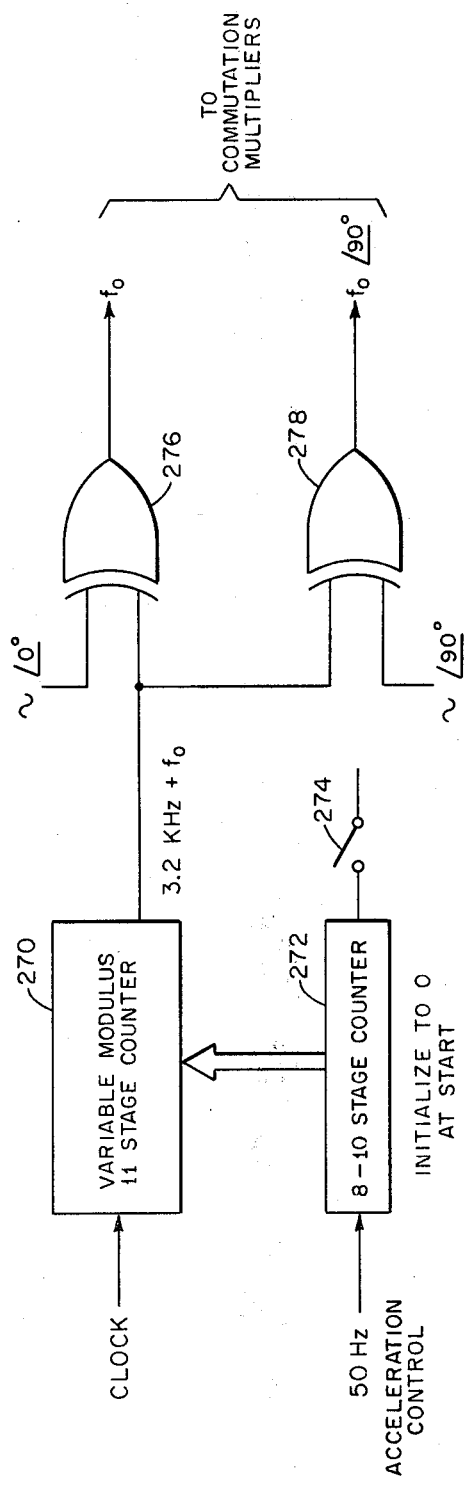
FIG. 9 is a circuit diagram of circuitry for use in starting rotation of the permanent magnet motor from a stopped condition.
Figure 10:
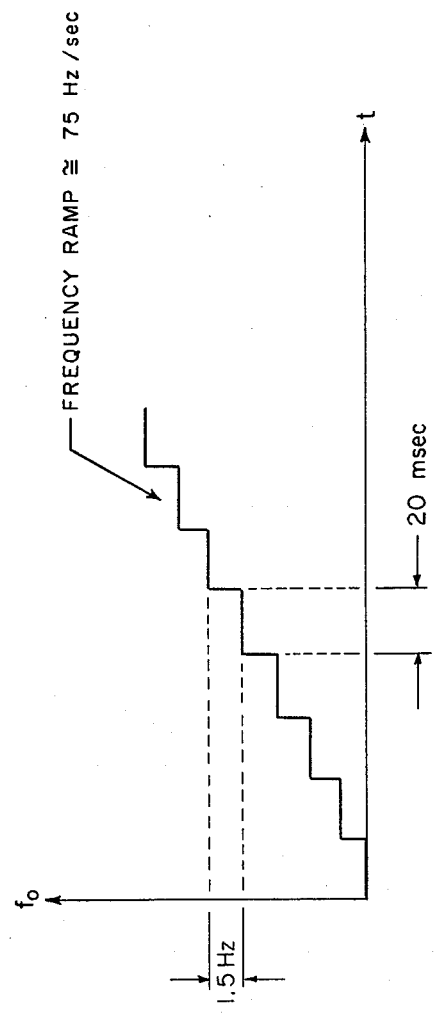
FIG. 10 is a waveform diagram explanatory of the circuitry of FIG. 9.

With reference now to FIGS. 9 and 10, circuitry and a corresponding waveform diagram, illustrate and explain the circuitry which provides motor start-up from rest. A variable modulus, 11 stage counter 270 is provided responsive to a high frequency clock input. The count modulus of the counter 270 is established by a 10 stage counter 272 which is initialized to zero at the beginning of a start-up sequence through a set switch 274 and which is clocked at a very low frequency such as 50 Hz at its clock input. The resulting output of the counter 270 will be a succession of clock pulses at an increasing rate. Typical rates are a 1.5 Hz jump every 20 milliseconds for a net frequency ramp of 75 Hz per second. The output of the counter 270 is applied as one input of respective exclusive OR gates 276 and 278. The other inputs of the gates 276 and 278 receive clock inputs in quadrature phase and thus provide quadrature phased outputs from the exclusive OR gates 276 and 278 of the general form utilized when the back EMF circuitry is operative. These outputs from the gates 276 and 278 are applied selectively through the switches 98 and 100 to the commutation and power amplifier state 78 during the slow speed end of the start cycle for the motor.

The above description of a preferred embodiment shows a high efficiency permanent magnet motor, typically for use in gyroscope applications, where heat dissipation is to be minimized. It should be noted that the specific circuitry and system illustrated above is exemplary only and is not to be taken as a limitation upon the scope of the invention as defined only in the following claims.

What is claimed is:

1. A permanent magnet A.C. motor system comprising:
   a permanent magnet motor having a stator and rotor, one of which includes a permanent magnet and the other of which includes electrically excitable plural windings for generating a varying magnetic field relative to said windings;
   means for applying A.C. excitation to said windings;
   means for continuously sensing the A.C. back EMF developed in said windings during the powering thereof as a function of both winding resistance and winding inductance in response to the excitation applied thereto;
   means for controlling the phase angle between the applied excitation and sensed back EMF to provide maximum torque.

2. The system of claim 1 wherein said windings are multiphased.

3. The system of claim 2 wherein said windings are two-phase.

4. The system of claim 1 wherein said means for sensing back EMF includes means responsive to the current and voltage applied to at least one of said windings.

5. The system of claim 1 further including:
   a clock source of predetermined frequency;
   said controlling means including means for exciting said windings with a characteristic to accelerate said rotor to rotate synchronously at the frequency of said source.

6. The system of claim 1 wherein the controlling means includes means for maintaining the applied excitation and sensed back EMF substantially in phase quadrature, for each of said windings.

7. The system of claim 1 wherein said back EMF sensing means includes:
   means for developing a signal corresponding to the applied excitation voltage less winding internal voltage drops:
   means for integrating the developed signal; and
   means for squaring the integrated signal half of the integrated, developed signal and a symmetrical, corresponding negative squarewave during half of the the negative half of the integrated, developed signal.

8. A permanent magnet motor system comprising:
   a permanent magnet motor having a stator and a rotor, one of which includes a permanent magnet and the other of which includes electrically excitable plural windings for generating a varying magnetic field relative to said windings;
   means for applying excitation to said windings;
   means for sensing the back EMF developed in said windings as a function of the excitation applied thereto;
   means for controlling the phase angle between the applied excitation and sensed back EMF to provide maximum torque;
   said means for sensing back EMF including means responsive to the current and voltage applied to at least one of said windings for compensating the sensed voltage by the magnitude of the sensed current in order to provide an indication of winding back EMF.

9. A permanent magnet motor system comprising:

a permanent magnet motor having a stator and a rotor, one of which includes a permanent magnet and the other of which includes electrically excitable plural windings for generating a varying magnetic field relative to said windings;

means for applying excitation to said windings;

means for sensing the back EMF developed in said windings as a function of the excitation applied thereto;

means for controlling the phase angle between the applied excitation and sensed back EMF to provide maximum torque;

said means for sensing back EMF including means for integrating the current and voltage applied to at least one of said windings.

10. A permanent magnet motor system comprising:

a permanent magnet motor having a stator and a rotor, one of which includes a permanent magnet and the other of which includes electrically excitable plural windings for generating a varying magnetic field relative to said windings;

means for applying excitation to said windings;

means for sensing the back EMF developed in said windings as a function of the excitation applied thereto;

means for controlling the phase angle between the applied excitation and sensed back EMF to provide maximum torque.

said means for sensing back EMF including means responsive to the current and voltage applied to at least one of said windings; and means for compensating sensed back EMF for variations in magnitude with motor speed.

11. A permanent magnet motor system comprising:

a permanent magnet motor having a stator and a rotor, one of which includes a permanent magnet and the other of which includes electrically excitable plural windings for generating a varying magnetic field relative to said windings;

means for applying excitation to said windings;

means for sensing the back EMF developed in said windings as a function of the excitation applied thereto;

means for controlling the phase angle between the applied excitation and sensed back EMF to provide maximum torque;

a clock source having a predetermined frequency clock output signal at said predetermined frequency; and means for energizing said windings with the sensed back EMF as a function of the phase difference between said clock output signal and sensed back EMF.

12. The system of claim 11 wherein:

said energizing means includes means for commutating a signal representing the phase differences between the clock output signal and sensed back EMF in alternating directions through said windings at commutation times defined by the sensed back EMF.

13. The system of claim 12 wherein:

said windings are two-phase windings; and said commutating means includes means for switching said phase difference representing signal through said two windings in quadrature phase relationship and with each winding being energized for a one-half cycle duty cycle to provide at any given instant of time energization of only one winding.

14. The system of claim 11 further including means for regulating the current applied to said windings as a function of the phase difference between said back EMF and clock signal.

15. A permanent magnet motor system comprising:

a permanent magnet motor having a stator and a rotor, one of which includes a permanent magnet and the other of which includes electrically excitable plural windings for generating a varying magnetic filed relative to said windings;

means for applying excitation to said windings;

means for sensing the back EMF developed in said windings as a function of the excitation applied thereto;

means for controlling the phase angle between the applied excitation and sensed back EMF to provide maximum torque;

a clock source of predetermined frequency;

said controlling means including means for exciting said windings with a characteristic to accelerate said rotor to rotate synchronously at the frequency of said source; and means selectively operable in place of said controlling means for providing a predetermined increase in rotation rate by said rotor from zero rotational velocity to a predetermined velocity below the synchronous running speed of said motor.

16. The system of claim 15 including:

means to disabling said selectively operable means at said predetermined velocity to enable said controlling means.

17. A permanent magnet motor system comprising:

a permanent magnet motor having a stator and a rotor, one of which includes a permanent magnet and the other of which includes electrically excitable plural windings for generating a varying magnetic field relative to said windings;

means for applying excitation to said windings;

means for sensing the back EMF developed in said windings as a function of the excitation applied thereto;

means for controlling the phase angle between the applied excitation and sensed back EMF to provide maximum torque;

said controlling means providing a control signal varying with phase angle between the applied excitation and sensed back EMF at synchronous rotor speed and of a predetermined level corresponding to rotor lag at rotor speeds below synchronous speed; and said excitation applying means providing a level of excitation corresponding to said control signal.

* * * * *